June 4, 1940. S. S. BLANC 2,202,810
MOTOR VEHICLE CHASSIS
Filed Aug. 15, 1938 3 Sheets-Sheet 1
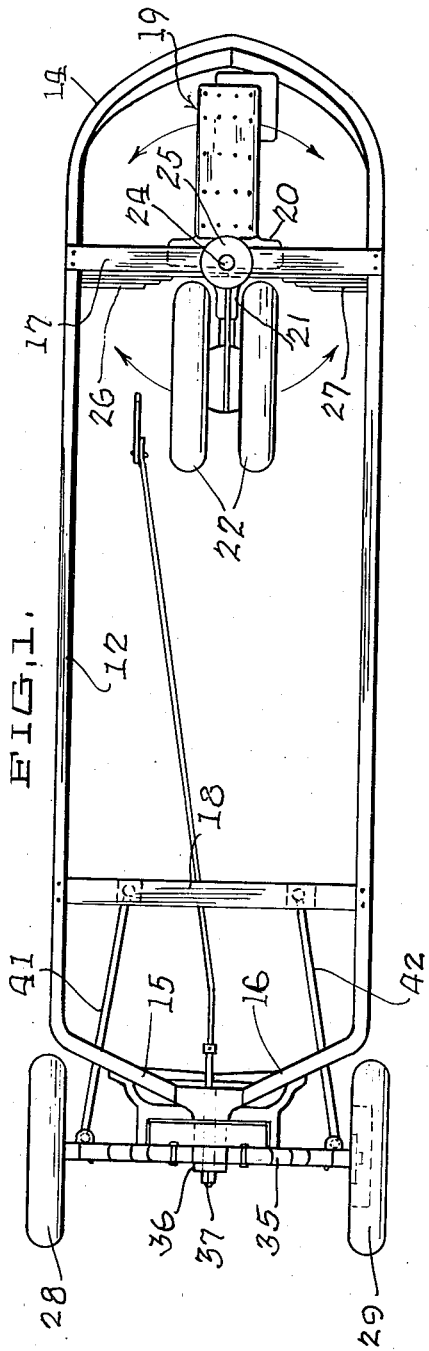
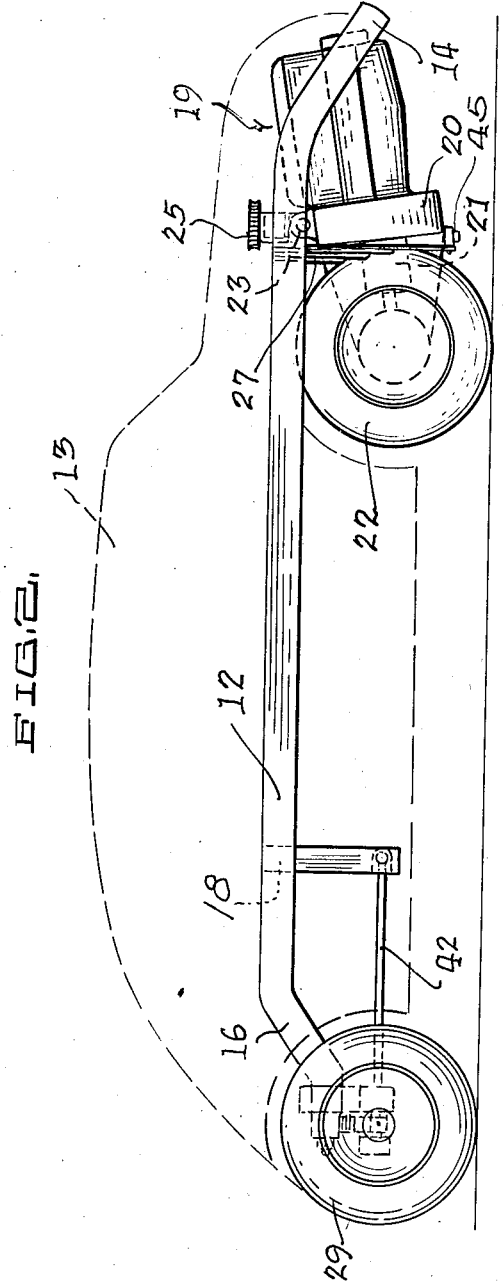
INVENTOR
STEWART S. BLANC
BY Victor J Evans Co
ATTORNEYS.

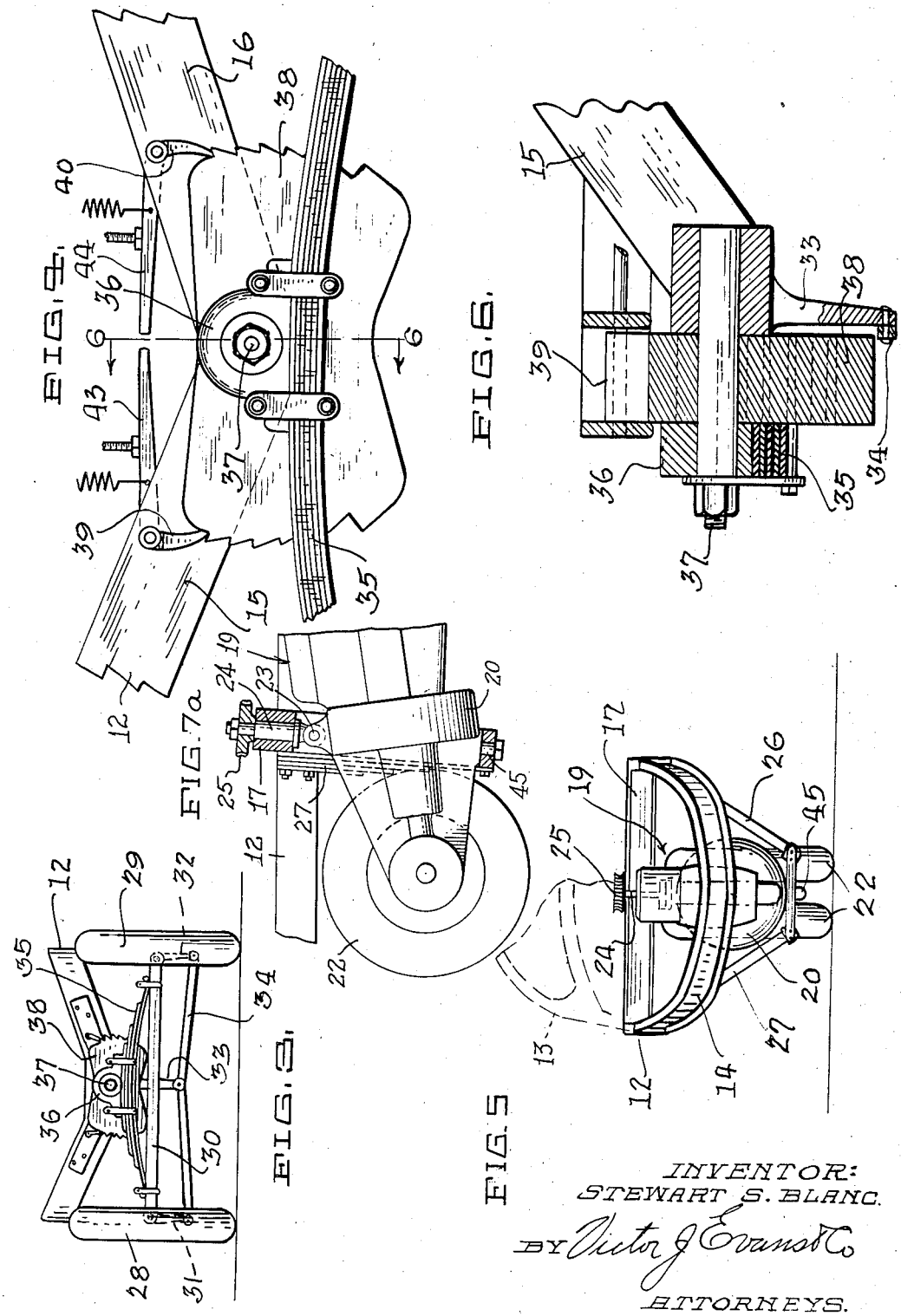

June 4, 1940.  S. S. BLANC  2,202,810
MOTOR VEHICLE CHASSIS
Filed Aug. 15, 1938  3 Sheets-Sheet 3
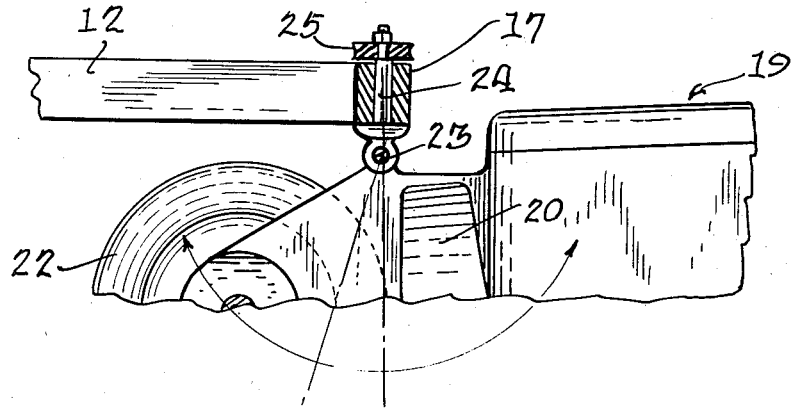
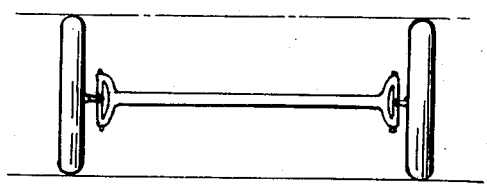
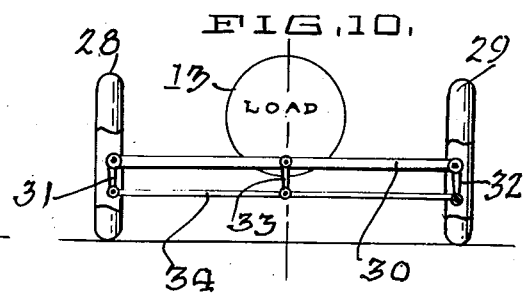
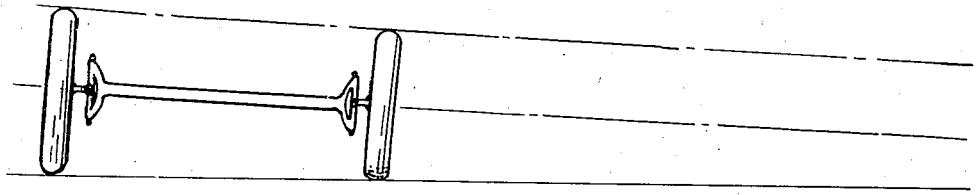
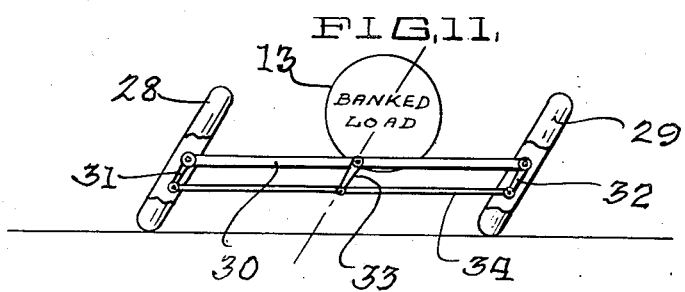
INVENTOR.
STEWART S. BLANC
BY
Victor J Evans Co
ATTORNEYS.

Patented June 4, 1940

2,202,810

UNITED STATES PATENT OFFICE 2,202,810

MOTOR VEHICLE CHASSIS

Stewart S. Blanc, Brisbane, Calif.

Application August 15, 1938, Serial No. 225,053

2 Claims. (Cl. 180—26)

This invention relates to improvements in automotive chassis constructions.

The principal object of the invention is the provision of a motor vehicle chassis and body that will bank on turns and at the same time maintain its true center of gravity when traveling straight regardless of the contour of the road traversed.

Another object of the invention is the provision of a motor vehicle chassis that embodies a power driving unit which is swingable together as a unit with the steering wheels of the vehicle.

A further object of the invention is to provide a vehicle and chassis of the class disclosed that comprises a power driving unit embodying a universally movable engine, pivoted for lateral and vertical movement in the frame and carrying as a part thereof centrally disposed steering wheels movable with the power unit for steering and driving purposes.

A still further object of the invention is to provide an improved chassis employing novel front end engine suspension, front end steering mechanism combined therewith, and a universally movable rear axle construction, the both functioning together to allow the wheels to flex relative to the chassis in passing over obstructions in the roadway and also causing the chassis and body of the vehicle to assume a banking action when rounding curves, as does a two-wheeled vehicle such as a motorcycle.

Other objects and advantages of the invention will become apparent with reference to the subjoined specification and the accompanying drawings in which:

Fig. 1 is a plan view of a motor vehicle chassis constructed in accordance with the principles of my invention;

Fig. 2 is a side elevation of the same showing a body outline in dot and dash lines;

Fig. 3 is a rear end elevation showing the rear end axle construction and the chassis suspension;

Fig. 4 is an enlarged elevation of a portion of the rear end chassis construction;

Fig. 5 is a front elevation illustrating the steering and traction wheels and their arrangement in the chassis, also the power unit in straight line position;

Fig. 6 is an enlarged sectional detail taken on the line 6—6 of Fig. 4;

Fig. 7 is an enlarged sectional detail of the engine mounting and the steering wheels in the chassis frame;

Fig. 7a is a side elevational view, partially in section, of portions of the engine mounting;

Fig. 8 is a diagrammatic view illustrating a vehicle axle having its wheels within a normal cylindrical area;

Fig. 9 illustrates the same in a position assumed when a blow-out occurs;

Fig. 10 is a diagrammatic view illustrating the rear linkage of my improved device; and Fig. 11 is a diagrammatic view illustrating the load shifted and the position of parts assumed by my improved construction as in rounding a curve.

In the usual motor vehicle construction embodying a chassis having two rear driving wheels and two spaced steering wheels it is well known that in rounding a curve the body of the vehicle, due to centrifugal action, tends to lurch or lean over on the chassis and to dish the wheels. Also, when a front or rear tire blows out in the conventional chassis construction a dangerous lurch occurs caused by the two wheels having the projected area of a cone instead of a normal cylindrical area as disclosed in Fig. 8. Therefore, to overcome this difficulty I have devised the present invention and in accomplishing these objects my improved chassis comprises a frame 12, as clearly shown in Figs. 1 and 2, a suitable body outline being indicated by the numeral 13. This frame is preferably rounded at the front end 14 and embodies inwardly bent rear sections 15 and 16 braced by means of cross braces 17 and 18.

The power unit 19 is mounted in the forward end of the frame and consists of a suitable engine unit including a flywheel 20 and transmission 21 suitably connected to and capable of driving the front traction wheels 22 which are arranged on an axle in close proximity in the longitudinal axis of the chassis, this unit as a whole being universally swingable in the chassis by means of a pin 23 and a king pin 24 mounted in the brace 17, as clearly depicted in Figs. 1, 2, 7 and 7a. This whole unit is swung to right or left relative to the chassis by means of a worm gear 25 mounted on the king pin 24 in steering the vehicle. It is to be noted, referring especially to Fig. 7a, that the axis of the king pin 24 inclines toward the rear at its lower end and the bearing 45 is considerably to the rear of pin 23. This inclination of the axis causes the driven wheels to assist in banking the vehicle, and weight is thrown from one wheel to another by means of the steering mechanism.

The unit 19 is held in a normal position substantially as shown in Figs. 2 and 5 by means of a pair of cantilever springs 26 and 27 rigidly connected to the chassis frame and extending angularly downwardly toward the bearing 45.

These springs while flexibly maintaining the power unit in position allow said unit to flex while traveling over the roadway and also allow the unit to be turned in steering the vehicle along with partially insulating engine vibration from the body.

The rear end construction of the vehicle comprises the spaced wheels 28 and 29 carried by an axle 30, the wheel hubs being linked together by means of links 31, 32 and 33, all of equal length, and connecting rod 34 in such manner as to form a parallelogram capable of allowing the wheels to cant in rounding a curve, as well as the entire chassis and body. These positions normal and banked are illustrated diagrammatically in Figs. 10 and 11.

The rear axle 30 is connected to the chassis by means of a truss spring 35 which spring is yoked to the frame by means of a yoke 36 and a pin 37, Figs. 1, 3 and 4.

Rigidly affixed to the spring 35 is a segmented ratchet about the pivot 37 capable of receiving pawls 39 and 40 which pawls are operated manually through the levers 43 and 44 from the driver's compartment. When the car stands still, the pawls engage the ratchet and hold the car upright. On attaining a reasonable speed the pawls are left disengaged allowing the car to bank. When about to stop the pawls are reengaged.

Radius rods 41 and 42 connect the rear axle 30 to extensions from the cross brace 18, as shown in Figs. 1 and 2.

It will thus be observed that I have produced a motor vehicle chassis that embodies a compact power and steering unit and one that will successfully bank and maintain the equilibrium of the vehicle body at all times whether rounding curves or passing over obstructions in the roadway, thus making a vehicle of this character much safer at high speeds, as well as a much more comfortable and practical conveyance than the conventional vehicle.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In an automotive vehicle of the type carried on a traction unit and trailer wheels, said traction unit being connected to and driven by a motor, the improvement which comprises a cradle carrying said traction unit and said motor, said cradle being pivotally mounted on parts of said vehicle for limited rotation about an axis slightly canted downwardly backwardly from vertical position.

2. A motor vehicle including a traction and power unit pivotally mounted in close proximity to the longitudinal axis of the chassis and being swingable about an axis slightly canted downwardly backwardly from vertical position.

STEWART S. BLANC.